Sept. 2, 1969  M. WALLENSTEIN  3,465,183
DEVICE FOR SUPPORTING AND DIRECT COOLING OF
TURBOALTERNATOR ROTOR END WINDINGS
Filed Jan. 16, 1967  3 Sheets-Sheet 1

INVENTOR
MIHÁLY WALLENSTEIN

BY Young + Thompson

ATTORNEYS

INVENTOR

MIHÁLY WALLENSTEIN

BY Young & Thompson

ATTORNEYS

United States Patent Office 3,465,183
Patented Sept. 2, 1969

3,465,183
DEVICE FOR SUPPORTING AND DIRECT COOLING OF TURBOALTERNATOR ROTOR END WINDINGS
Mihály Wallenstein, Budapest, Hungary, assignor to Ganz Villamossagi Muvek, Budapest, Hungary
Filed Jan. 16, 1967, Ser. No. 609,608
Claims priority, application Hungary, Feb. 5, 1966, WA-154
Int. Cl. H02k 9/16
U.S. Cl. 310—54                                8 Claims

ABSTRACT OF THE DISCLOSURE

In an alternator comprising a rotor with end windings, the cooling is improved and at the same time the mechanical strength is increased. For this purpose a centering ring is provided at each end of the rotor for securing the end windings, and at least one centering tube and one endbell are fixed to the body of the rotor; at the same time insulating spacers are mounted on centering tubes, and inside the endbells. The end windings are positioned between the insulating spacer inside the endbell and the insulating spacer on the centering tube, so as to define chambers between adjacent end windings and said insulating spacers. The centering tube or tubes and the associated insulating spacer have channels formed in them for the passage of coolant into and out of the chambers, the end windings being formed with transverse ducts for the passage of the coolant between the chambers.

This invention relates to alternators. The rotor is mechanically the most highly stressed part of a 2-pole A.C. electric synchronous machine, or S.C. turbo-alternators. In such apparatus the D.C. excited windings are located in slots formed in the rotor block which is usually of steel or iron. High mechanical stresses arise in the rotor-block material due partly to the centrifugal force of the rotor itself, and partly to that of the windings embedded in the rotor.

The centrifugal force of the connections of the D.C. windings, the so-called end wirings, located at both ends of the rotor block, is counteracted by elements especially designed for that purpose, the so-called retaining rings and endbells which are usually made of nonmagnetic steel. The basic mechanical stress in the retaining rings is likewise caused by their own centrifugal force as well as by that of the supported windings.

Besides the basic stress caused by the centrifugal force considerable additional mechanical stresses arise, for example bending stress caused by the weight of the rotor, the residual stresses of forging and annealing and the additional stresses caused by machining.

The endbell system for fixing the end windings is even more subject to additional stresses. The occurrence and extent of a part of these stresses depends to a large degree upon the structural shape of the retaining ring. The uneven distribution of the windings under the retaining rings may cause an additional bending stress, which however can be influenced only to a small degree by the design. Stresses arising from prestressing of the endbell can be determined by the designer to a certain extent, partly by choosing the speed at which the endbell is freed from its position and partly by the elasticity of the fitting elements which retain the endbell in position.

The formation of ventilation bores in the endbell causes high local stresses.

Additional stress caused by the shape of the connection between the endbell system and the rotor shaft depends entirely upon the design.

Accordingly to the invention there is provided an alternator comprising a rotor with end windings, a centering ring provided at each end of the rotor for securing the end windings, at least one centering tube and one endbell fixed to the body of the rotor, insulating spacers mounted on the or each centering tube and inside the or each endbell, the end windings being positioned between the insulating spacer inside the or each endbell and the insulating spacer on the or each centering tube so as to define a chamber between adjacent end windings and said insulating spacers, the or each centering tube and associated insulating spacer having channels formed therein for the passage of coolant into at least one chamber and out of at least one other chamber and said end windings being formed with transverse ducts therethrough for the passage of coolant between chambers.

A specific embodiment of the invention will now be described by way of example with reference to the accompanying drawings in which:

FIGURES 1a–d show in cross section a part of the end of a rotor with previously proposed retaining ring arrangements;

FIGURE 3b is a cross section along the line A—A of FIGURE 3a.

In the drawings like parts have been given the same reference numerals.

Figure 1A:
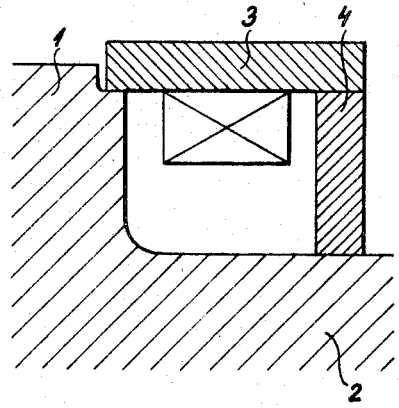
Figure 1B:
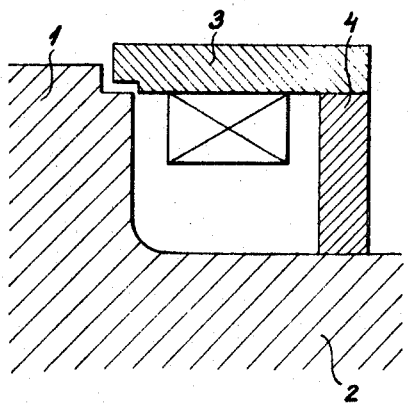
Figure 1C:
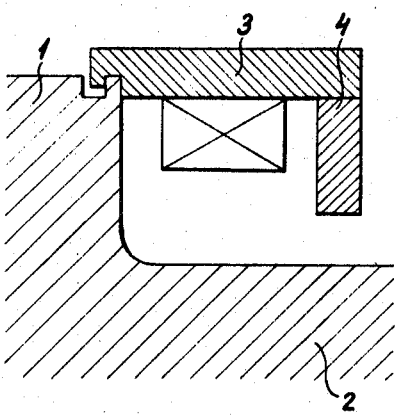
Figure 1D:
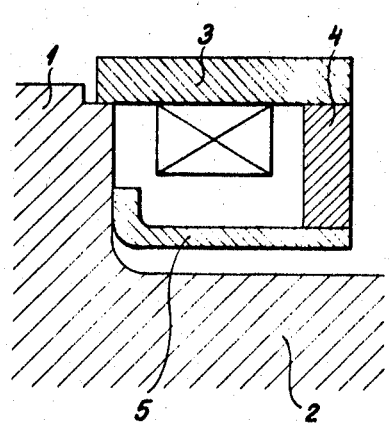

FIGURE 1a shows a centering ring 4 rigidly shrunk onto a rotor shaft 2, an endbell 3 being shrunk onto the centering ring 4 as well as onto the rotor body. In FIGURE 1b a centering ring 4 is shown rigidly shrunk on rotor shaft 2, and endbell 3 shrunk onto the centering ring, but not onto the rotor body 1. FIGURE 1c shows endbell 3 shrunk rigidly onto rotor body 1, the centering ring 4 not being in contact with rotor shaft 2. FIGURE 1d shows endbell 3 shrunk rigidly on the rotor body 1 and onto the centering ring 4. The centering ring 4 is fitted to centering tube 5 and the tube is fastened to rotor body 1.

These various solutions have been proposed as a consequence of studying the phenomenon, that the bending deflection of the shaft end due to the bearing reaction is transferred to the endbell at the point of the rigid connection between centering ring and shaft and brings about undesirable additional stresses in the endbell itself as well as on its fitting surfaces.

Efforts have been made to loosen this connection, render it more elastic, and make the endbell system independent of the shaft end movement.

Another basic problem of turbo-alternator rotors—especially in the case of higher-output machines—is the provision of intensive cooling for the D.C. windings. It was previously proposed to bring the coolant for example air or hydrogen, directly into contact with the current-carrying material. By means of such so-called direct cooling the losses in the winding can be dissipated with only a small rise in temperature. Several proposals have been made for direct cooling of the conductor. In general it is characteristic of the prior proposals, that cooling of the end winding is less intensive than that of the straight coil part embedded in the rotor. Usually the end windings are hollow conductors. The cooling gas is led into ducts in the hollow conductors by means of bores or openings in the end windings and is led out through the part of the windings embedded in the rotor. The temperature rise is considerable in long cooling ducts and thus the temperature of the winding is high at the gas outlet causing a so-called "hot-spot" to develop. It is usually this phenomenon which limits the current carrying capacity of the rotor with a direct cooling system of this kind.

Another disadvantage of the prior proposals is that the dimensions of the duct must be made large in order to obtain a sufficiently large volume of coolant gas, as well as a high gas velocity, and this determines the cross-section of the conductor. A large conductor cross-section resulting from a large duct results in a high attainable current density and in a very high excitation current, which in the case of machines of very high output may be as high as 4000–5000 amps. To bring about a high excitation current and to lead it into the windings poses further problems.

In the arrangement according to the invention cooling of end windings is rendered independent of the cooling of the windings embedded in the rotor. At the same time the cooling ducts of the end windings are divided into short sections in a known way, in order to make all the ducts from parallel gas flow paths. The cross section of such short ducts and that of the conductors may be made considerably smaller than usual. Cooling is very effective in consequence of the large gas quantity, the large cooling surface and of the relatively high heat-transfer coefficient, the latter being due to the short duct length. The cross section of the conductor can be arbitrarily chosen, and thereby the excitation current can be kept at a low valve, for example, about 2,000 amps, even in the case apparatus designed for a high output.

The alternator according to the invention solves at the same time three fundamental problems of high-output turboalternator rotors, namely: the support of the end windings independently of the movements of the shaft, intensive cooling of the end windings independently of the windings embedded in the rotor and provision of a relatively moderate excitation current.

Figure 2:
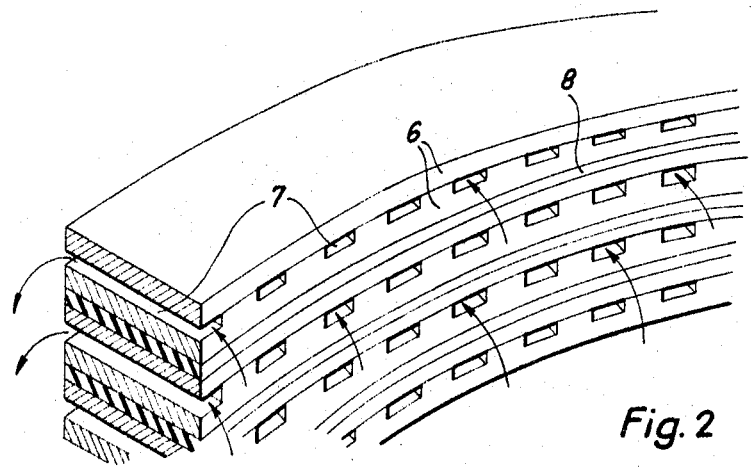
FIGURE 2 shows a part of one end winding having ducts formed therethrough.

FIGURE 2 shows a conductor material which has been provided with ventilating ducts 7, which are transverse with respect to conductors 6 and which are provided in the straight as well as the curved section of the end windings. It is characteristic of the ducts 7 that their length is short and also that the ducts connect the two sides of the conductor columns, thus enabling the crosswise flow of cooling gas. The conductors 6 are separated by insulating material 8.

Figure 3A:
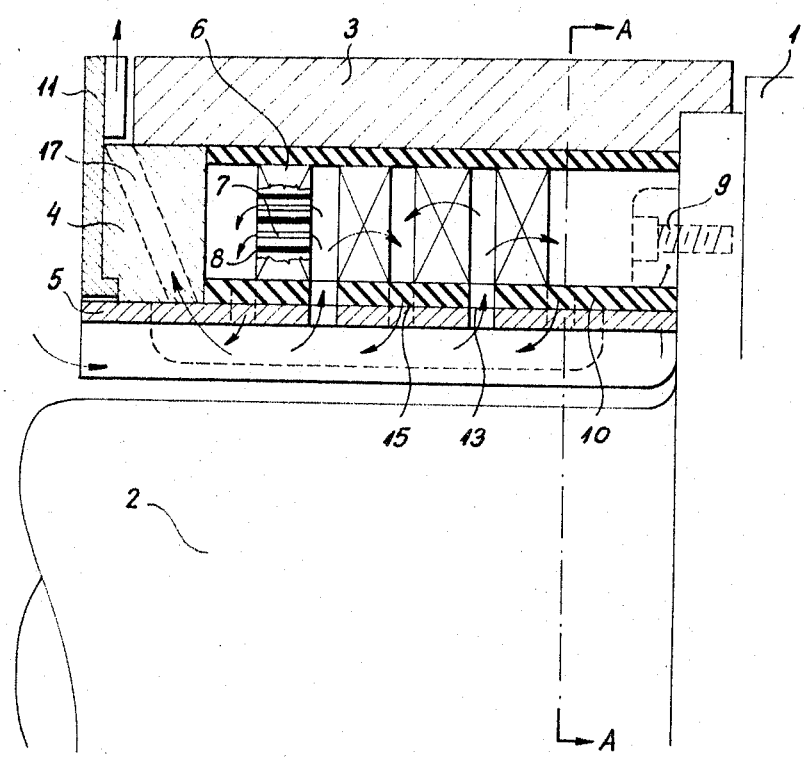
FIGURE 3a shows an embodiment of the invention.
Figure 3B:
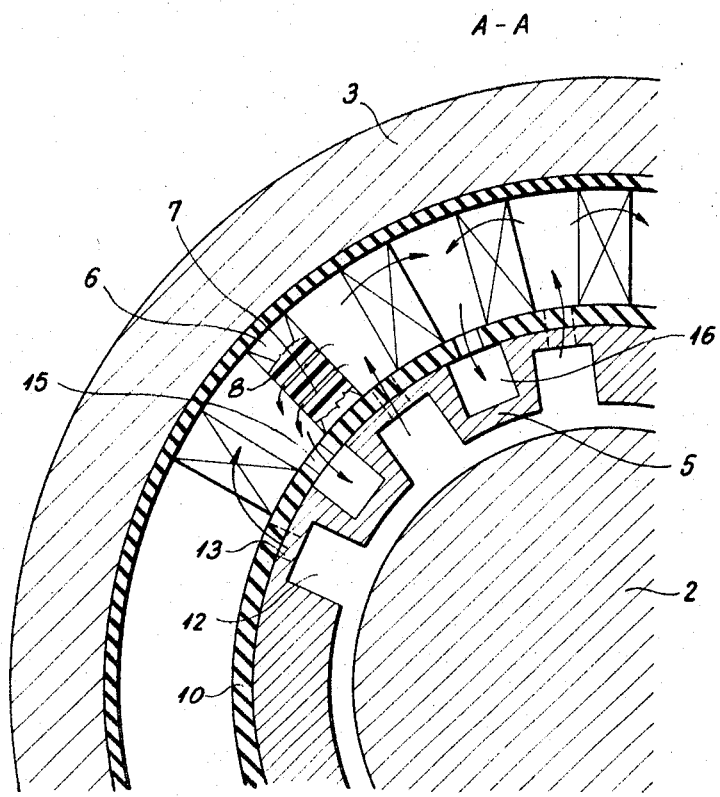

An arrangement according to the invention is shown in FIGURES 3a and 3b. Here a centering tube 5 is provided, which fixes the endbell system independently of deflections of the rotor shaft 2, enabling at the same time independent ventilation of the end windings, and which is fastened with bolts 9 (only one being shown) to rotor body 1. The end windings are fitted on an insulating spacer 10 which is fixed to the centering tube, the end windings consisting of conductors 6 and intermediate insulators 8. Centering ring 4 is fixed to the centering tube 5 and the endbell 3 is shrunk onto the ring 4 and the rotor body 1. A radial-bladed fan 11 is disposed on the front of the rotor to circulate the gas for cooling the end windings.

The cooling gas flows in the direction of the arrows through ducts 12 of centering tube 5. The cooling gas then flows through openings 13 of the insulating spacer 10 and the centering tube 5 between the individual winding columns. Bracing elements made of insulating material and placed here enable the cooling gas to enter the ventilation ducts 7 which are arranged transversely in the conductors.

After having passed through the ducts 7 of the winding columns the cooling gas flows into a space which communicates through bores 15 of the spacer 10 with ducts 16 of the centering tube 5. The cooling gas is then exhausted by the fan 11 through bores 17 of the centering ring 4.

What I claim is:

1. An alternator comprising a rotor with end windings, a centering ring provided an end of the rotor for securing the end windings, a centering tube and an endbell fixed to the body of the rotor, insulating spacers mounted on the centering tube and inside the endbell, the end windings being positioned between the insulating spacer inside the endbell and the insulating spacer on the centering tube so as to define chambers between adjacent end windings and said insulating spacers, the centering tube and associated insulating spacer having channels formed therein for the passage of coolant into at least one chamber and out of at least one other chamber and said end windings being formed with transverse ducts therethrough for the passage of coolant between chambers.

2. An alternator as claimed in claim 1, wherin the or each centering tube is provided with a first set of axial channels for passage of coolant from the interior of the centering tube to said chambers and with a second set of axial channels for passage of coolant from said chambers.

3. An alternator as claimed in claim 2, wherein at least one exhaust passage is formed in the centering ring whereby coolant may flow from said second set of axial channels, through the exhaust passage whence said coolant is exhausted.

4. An alternator as claimed in claim 3, wherein the exhaust passage is arranged to lead coolant to the external cylindrical surface of the endbell.

5. An alternator as claimed in claim 1, in which said end windings and said chambers are disposed in alternation with each other in a direction parallel to the axis of the rotor, said transverse ducts communicating between the chambers which are on opposite sides of the associated end windings.

6. An alternator as claimed in claim 5, said transverse ducts being substantially parallel to the axis of the rotor.

7. An alternator as claimed in claim 6, said end windings consisting of conductors and intermediate insulators that are disposed in concentric overlying relationship with each other and in alternation to each other, each of said conductors being traversed by a peripherally spaced apart series of said traverse ducts.

8. An alternator as claimed in claim 5, said centering tube having ducts therein that extend substantially parallel to the axis of the rotor, there being a duct disposed radially inwardly of each said chamber, a first series of said centering tube ducts supplying coolant to the channels for passage of coolant into the chambers, a second series of said centering tube ducts communicating with the channels for the passage of coolant out of said chambers, the ducts of said first and second series being disposed in alternation with each other about said centering tube.

References Cited

UNITED STATES PATENTS

| 1,819,860 | 8/1931 | Belfils | 310—65 |
| 2,844,746 | 7/1958 | Coggeshall | 310—65 |

FOREIGN PATENTS

| 574,640 | 4/1959 | Canada. |

WARREN E. RAY, Primary Examiner
R. JKUDY, Assistant Examiner

U.S. Cl. X.R.
310—64